United States Patent [19]

Hoshino et al.

[11] Patent Number: 4,832,258

[45] Date of Patent: May 23, 1989

[54] MEASURING CIRCUIT FOR USE IN DEVICE FOR DETECTING AMBIENT AIR TEMPERATURE

[75] Inventors: Seiichi Hoshino, Nitta; Yasuji Tamura, Ojima; Hidemitsu Akabane, Takasaki; Toshimi Isobe, Isesaki, all of Japan

[73] Assignee: Sanden Corporation, Gunma, Japan

[21] Appl. No.: 182,173

[22] Filed: Apr. 15, 1988

[30] Foreign Application Priority Data

Apr. 15, 1987 [JP] Japan .............................. 62-57297[U]

[51] Int. Cl.$^4$ ............................................. G05D 23/00
[52] U.S. Cl. ................... 236/13; 236/46 F; 236/91 R; 165/35; 165/42
[58] Field of Search ........ 236/13, 46 R, 46 F, 236/91 R, 91 D, 91 C, 91 E, 91 F, 78 D; 165/16, 12, 23, 30, 35, 36, 42, 43; 62/133, 157, 158

[56] References Cited

U.S. PATENT DOCUMENTS

| | | | |
|---|---|---|---|
| 4,289,195 | 9/1981 | Bellot et al. .......................... | 165/12 |
| 4,326,386 | 4/1982 | Tamura ................................. | 62/150 |
| 4,328,855 | 5/1982 | Iwata et al. ......................... | 165/30 X |
| 4,337,821 | 7/1982 | Saito .................................. | 236/91 G |
| 4,344,565 | 8/1982 | Kojima et al. ...................... | 236/46 R |
| 4,345,714 | 8/1982 | Kojima ............................... | 236/46 R |
| 4,471,632 | 9/1984 | Nishi et al. .......................... | 62/208 |
| 4,494,184 | 1/1985 | Crevel ................................. | 165/30 X |
| 4,537,245 | 8/1985 | Nishimura et al. ................... | 165/22 |
| 4,539,821 | 9/1985 | Tamura ............................ | 62/228.5 X |

Primary Examiner—Harry B. Tanner
Attorney, Agent, or Firm—Banner, Birch, McKie & Beckett

[57] ABSTRACT

A device for controlling an opening angle of an air mixing damper used in an automotive air conditioning system is disclosed. The device has an actuator for operating the air mixing damper and a blower for blowing the air. The device comprises an ambient air temperature sensor which is disposed on a front grill of an automobile for detecting the ambient air temperature at the exterior of the automobile and for providing a control signal, and a measuring circuit which computes the ambient air temperature data necessary for controlling the actuator and blower based on the detected ambient air temperature. The device controls the opening angle of the air mixing damper in accordance with the measured results.

10 Claims, 8 Drawing Sheets

MEASURING CIRCUIT FOR USE IN DEVICE FOR DETECTING AMBIENT AIR TEMPERATURE

TECHNICAL FIELD

This invention relates to an automotive air conditioning system, and more particularly, to a measuring circuit for use in a device for detecting ambient air temperature in an automotive air conditioning system.

BACKGROUND OF THE INVENTION

In an automotive air conditioning system having an automatic control device, the control device conventionally includes a control circuit which compares a predetermined air temperature, an automobile compartment air temperature and an ambient air temperature to control the opening angle of an air mixing damper. The air mixing damper is operated by an actuator which regulates the degree of the opening of the damper in accordance with an output signal received from the control circuit to thereby control the temperature of the air blown into the automobile compartment from an air duct of the air conditioning system.

In this type of automotive air conditioning system, an ambient air temperature sensor for detecting ambient air temperature at the exterior of the vehicle is conventionally attached at a portion of the front grill of an automobile so that the ambient air temperature can be accurately detected while the automobile is being driven. However, when the automobile is idling, the ambient air temperature sensor will detect a higher temperature than the actual ambient air temperature because the detected ambient air temperature is affected by the wasted heat of the automobile engine.

To resolve this problem, it has been conventionally proposed to use an ambient air temperature sensor which has a large heat capacity so that the rate at which the sensor responds to temperature changes is delayed, or alternatively to employ a control circuit which delays the response to a temperature change, detected by an ambient air temperature sensor which has a small heat capacity, for a certain time. As a result of delaying the response time to a variance in temperature, the opening angle of the damper can be prevented from being improperly increased.

In spite of the above solution, if the automobile idles for a long time, the ambient air temperature sensor will become sufficiently heated by the wasted heat of the automobile engine, that the ambient air temperature data which is detected by the ambient air temperature sensor will nonetheless become high as compared with the actual ambient air temperature. Then, when the automobile is thereafter driven, the ambient air temperature surrounding the ambient air temperature sensor will quickly decrease to the actual ambient air temperature. However, the ambient air temperature data which is maintained by the control device will not quickly equal the actual ambient air temperature because the conventional control device is predetermined to delay any response for a certain time. Thus, the opening angle of the damper will be smaller than desired until the detected ambient air temperature data equals the actual ambient air temperature, and the heating of the automobile compartment will be insufficient for a certain period of time.

SUMMARY OF THE INVENTION

It is an object of this invention to provide a measuring circuit for use in a device for detecting ambient air temperature which can suitably regulate the air temperature in an automobile compartment.

It is another object of this invention to provide a measuring circuit for use in a device for detecting ambient air temperature which resolves the problem of inadequate heating at the start of driving after a long idling period.

A device for controlling an opening angle of an air mixing damper used in an automobile air conditioning system according to the present invention includes an actuator for operating air mixing dampers and a blower for blowing the air. The device comprises an ambient air temperature sensor disposed on a front grill of an automobile for detecting the ambient air temperature at the exterior of the automobile and for providing a control signal representative of the detected temperature, and a measuring circuit which measures ambient air temperature data necessary for controlling the actuator and blower based on the detected ambient air temperature. The device controls the opening angle of the air mixing damper in accordance with the measured results.

Further objects, features and other aspects of this invention will be understood from the detailed description of the preferred embodiments of this invention taken in conjunction with the accompanying drawings.

DETAILED DESCRIPTION OF THE PREFERRED EMBODIMENT

Figure 1:
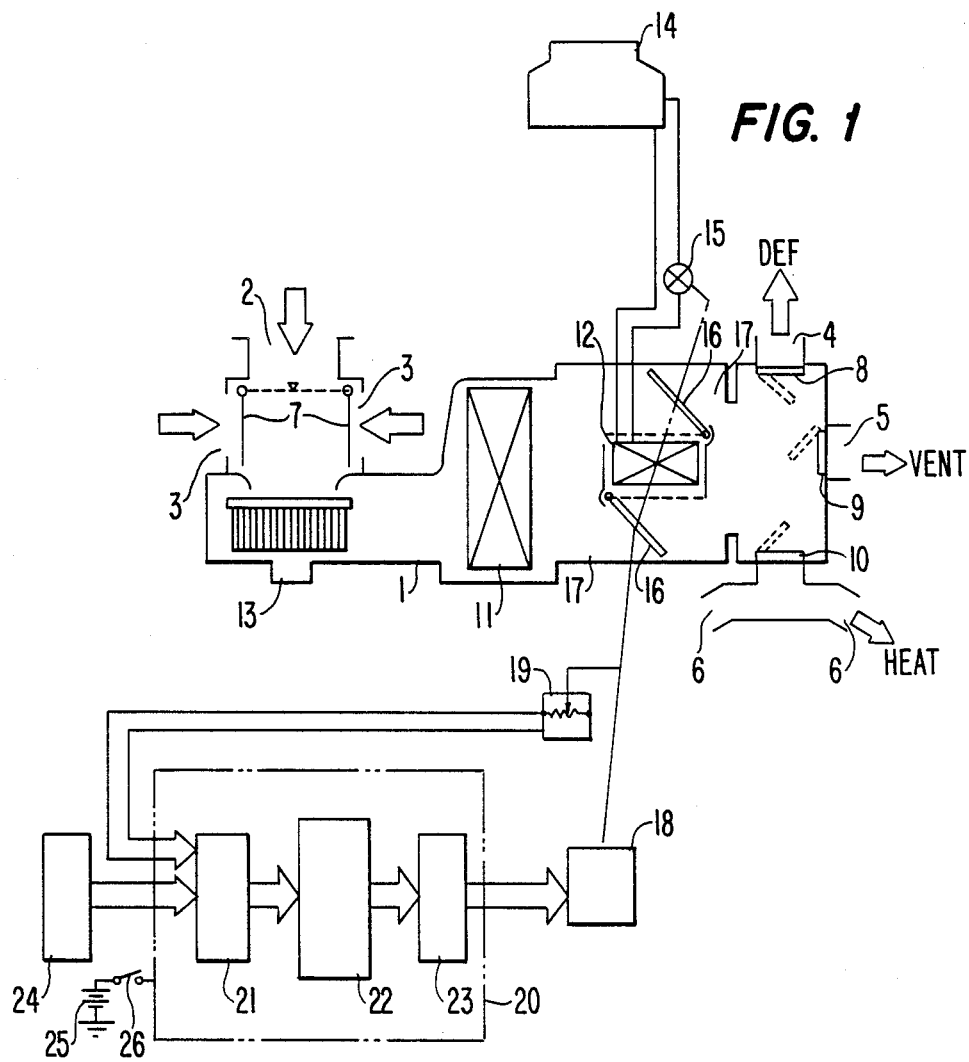
FIG. 1 is a schematic view of an automotive air conditioning system incorporating the present invention.

Referring first to FIG. 1, an automotive air conditioning system incorporating the present invention is shown.

As shown in the figure, the air conditioning system includes a duct 1 having a fresh air inlet 2 and a recirculated air inlet 3 at its upstream end, and having a defroster air outlet 4, an upper air outlet 5 and a lower air outlet 6 at its downstream end. Arranged in the interior of duct 1 are a first selector damper 7 disposed to selectively permit air to enter the duct through fresh air inlet 2 or recirculated air inlet 3, a second selector damper 8 disposed to selectively open and close defroster air outlet 4, a third selector damper 9 disposed to selectively open and close upper air outlet 5 and a fourth selector damper 10 disposed to selectively open and close lower air outlet 6. Also provided at an axially intermediate location in duct 1 are evaporator 11 and heater core 12, the latter being located downstream of the former. Blower 13 is also provided in the interior of duct 1, and is positioned upstream of evaporator 11. Evaporator 11 is part of a refrigerating circuit, and heater core 12 is heated using the heat of engine cooling water provided from automobile engine 14. The volume of cooling water introduced into heater core 12 is controlled by a water valve 15 disposed in a conduit connecting heater core 12 and engine 14. Air mixing dampers 16 are provided at both sides of heater core 12 and regulate the ratio of air passing through heater core 12 versus the air flowing through the duct without passing in heat-exchanging relation with the heater core to thereby control the temperature of the air blown into the automobile compartment by appropriate mixing of cool air and warm air. Air mixing dampers 16 are mechanically coupled with water valve 15 through a wire, link or the like, so that the air dampers and valve 15 can be operated together, and the dampers are operated by actuator 18 which is also mechanically coupled with dampers 16 through a wire or the like. A potentiometer 19 is coupled to actuator 18 and electrically communicates the position of the actuator to control device 20.

Control device 20 includes an A/D converter 21, a microcomputer 22 and a driver 23, which are serially connected to each other. Potentiometer 19 and a plurality of sensors 24, for example, a room air temperature sensor, an ambient air tempertaure sensor, an evaporator temperature sensor, a water temperature sensor, a sunlight temperature sensor, etc., are connected to control device 20, and control device 20 is connected to actuator 18. Control device 20 is also connected to a battery 25 through an ignition switch 26. Microcomputer 22 computes the temperature of the air blown out to the automobile compartment based on signals detected at sensors 24, and outputs signals to actuator 18 and blower 13 to control the opening angle of air mixing dampers 16 and the voltage of blower 13.

Figure 2:
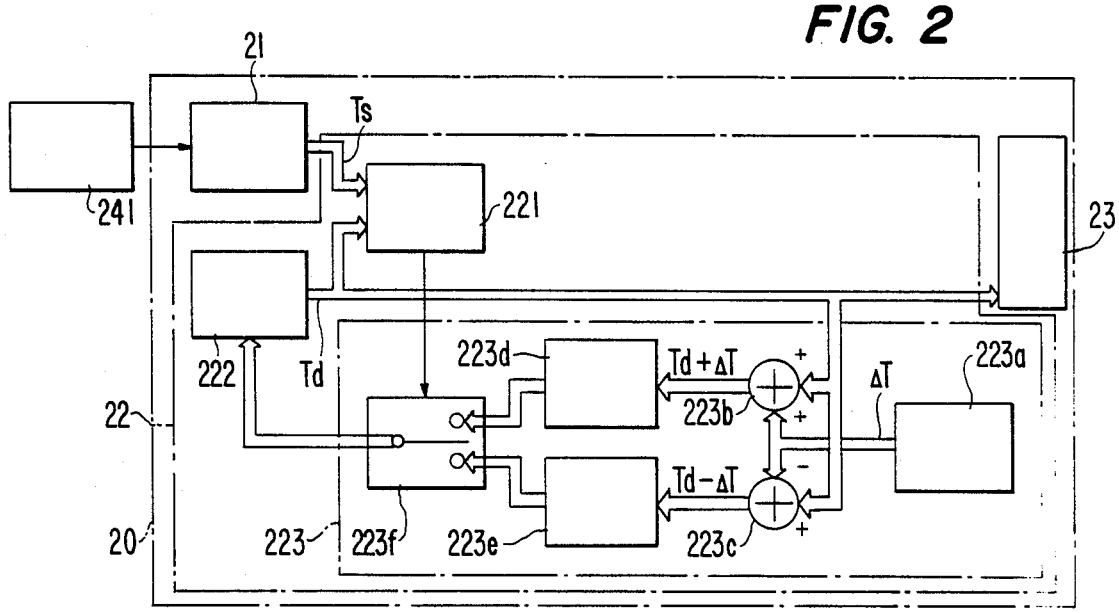
FIG. 2 is a block diagram which shows a measuring circuit for use in a device for detecting ambient air temperature in accordance with a first embodiment of this invention.

With reference to FIG. 2, a block diagram of a measuring circuit for use in a device for detecting ambient air temperature in accordance with a first embodiment of this invention is shown. Control device 20 comprises A/D converter 21, micro-computer 22 and driver 23, which are serially connected to each other, as described above. Microcomputer 22 comprises compare means 221, an ambient air temperature resistor 222 and a central processing unit 223. An ambient air temperature sensor 241 detects the ambient air temperature at the exterior of the vehicle and generates a temperature signal Ts which is supplied to microcomputer 22 through A/D converter 21. Microcomputer 22 then computes ambient air temperature data Td for controlling the automobile air conditioning system as described below in detail.

Ambient air temperature resistor 222 stores the current ambient air temperature data Td. Compare means 221 compares detected temperature Ts, which is output from A/D converter 21, with ambient air temperature data Td, which is output from ambient air temperature resistor 222. If detected temperature Ts is greater than temperature data Td, compare means 221 outputs a first selective control signal to central processing unit 223. Otherwise, compare means 221 outputs a second selective control signal to central processing unit 223. Central processing unit 223 processes temperature data Td in a first response time or a second response time, responsive to receipt of the first selective control signal or the second selective control signal. Control processing unit 223 then outputs the processed temperature data, as new temperature data Td, to temperature resistor 222. In this embodiment, the first response time is predetermined to be longer than the second response time.

Central processing unit 223 includes temperature change rate maintaining means 223a which stores a predetermined temperature change rate $\Delta T$, adding means 223b, subtracting means 223c, first delay means 223d, second delay means 223e and selecting means 223f. Adding means 223b adds predetermined temperature change rate $\Delta T$, which is output from maintaining means 223a, to temperature data Td and outputs a signal to first delay means 223d. Subtracting means 223c subtracts predetermined temperature change rate $\Delta T$ from temperature data Td and outputs a signal to second delay means 223e. First delay means 223d outputs the signal from adding means 223b to selecting means 223f after a first predetermined time $\Delta t1$, and second delay means 223e outputs the signal from subtracting means 223c to selecting means 223f after a second predetermined time $\Delta t2$. First predetermined time $\Delta t1$ is predetermined to be longer than second predetermined time $\Delta t2$ in this embodiment. Seslecting means 223f selects a signal from first delay means 223d in response to the first selective control signal from compare means 221, and selecting means 223f selects a signal from second delay means 223e in response to the second selective control signal from compare means 221. The selected signal is then output to temperature resistor 222, which stores the signal as new temperature data.

Figure 3:
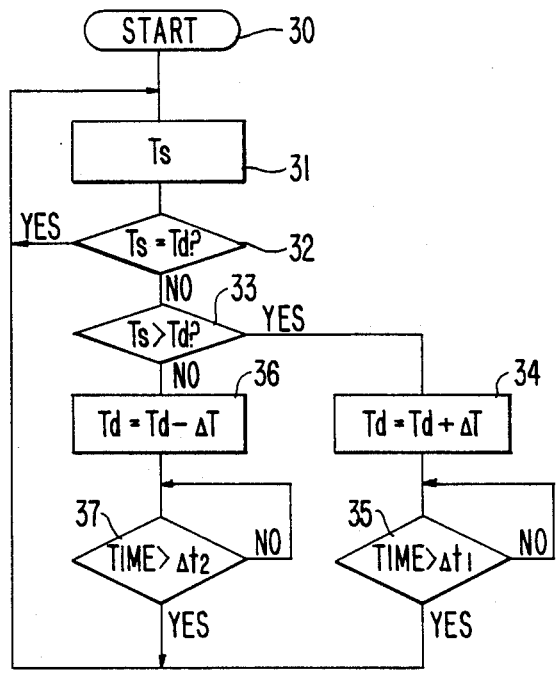
FIG. 3 is a flowchart illustrating the operation of the first embodiment of this invention.

Referring to FIG. 3, a flowchart illustrating the operation of microcomputer 22 is shown. When the automotive air conditioning system is turned on in step 30, ambient air temperature sensor 241 detects the ambient air temperature and outputs detected temperature Ts to compare means 221, through A/D converter 21, in step 31. In step 32, detected temperature Ts is compared with temperature data Td. If detected temperature Ts equals temperature data Td, control returns to step 31. Otherwise, control passes to step 33. If detected temperature Ts is greater than temperature data Td, control passes to step 34, and compare means 221 outputs the first selective control signal to selecting means 223f, thereby causing selecting means 223f to select a signal from first delay means 223d. In step 34, predetermined temperature change rate $\Delta T$, output from maintaining means 223a, is added to temperature data Td by adding means 223b, and control passes to step 35. In step 35, first delay means 223d outputs temperature data Td, which was computed in step 34, to temperature resistor 222 through selecting means 223f after a first predetermined time $\Delta t1$.

In step 33, if detected temperature Ts is less than temperature data Td, control passes to step 36, and compare means 221 outputs the second selective control signal to selecting means 223f thereby causing selecting means 223f to select a signal from second delay means 223e. Predetermined temperature change rate $\Delta T$, output from maintaining means 223a, is subtracted from temperature data Td by subtracting means 223c and control then passes to step 37. In step 37, second delay means 223e outputs temperature data Td, which was computed at step 36, to temperature resistor 222 after a second predetermined time $\Delta t2$.

Figure 4:
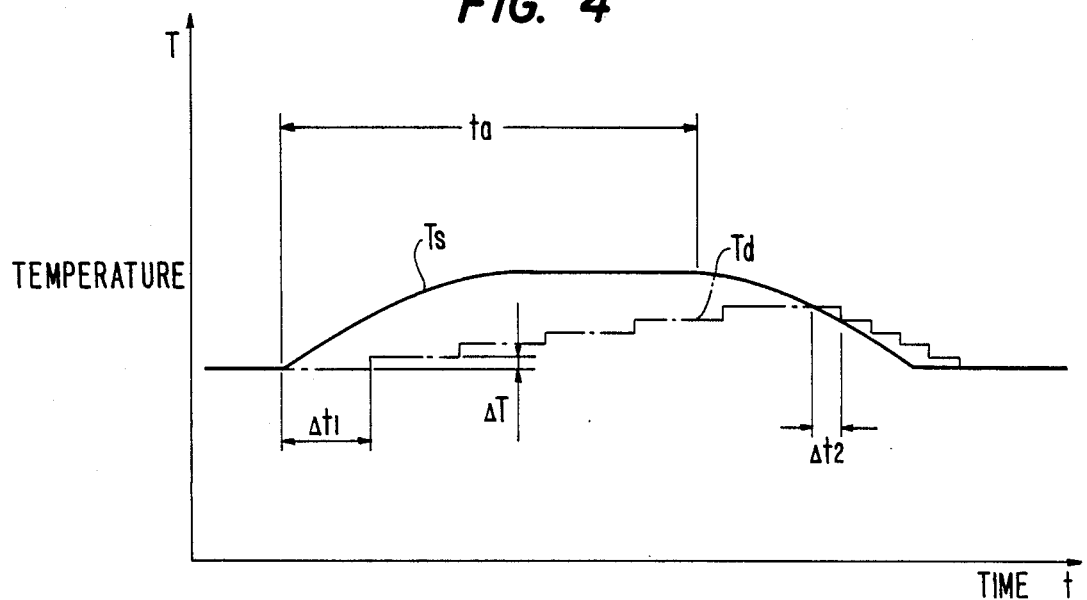
FIG. 4 is a graph illustrating the relationship between the ambient air temperature data maintained by the control device and the detected ambient air temperature as the detected air temperature changes over time in the first embodiment of this invention.

Referring to FIG. 4, a graph illustrating the relationship between the ambient air temperature data maintained by the control device and the detected ambient air temperature as the detected ambient temperature changes over time is shown. The time which the control device takes to respond to adjust ambient air temperature data Td while detected temperature Ts is increasing during idling time ta is longer than while detected temperature Ts is decreasing. Thus, when the automobile is driven following an idling period, temperature data Td can be quickly adjusted to approximate detected temperature Ts, which is the actual ambient air temperature.

Figure 5:
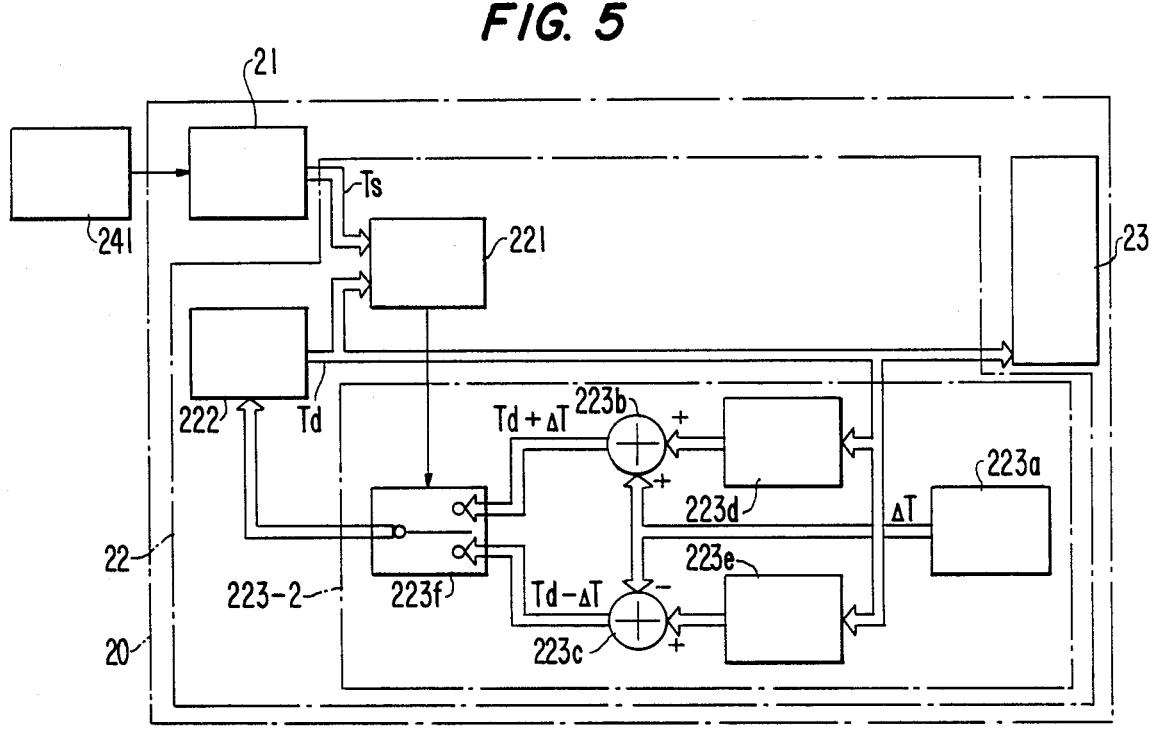
FIG. 5 is a block diagram which shows a measuring circuit for use in a device for detecting ambient air temperature in accordance with a second embodiment of this invention.
Figure 6:
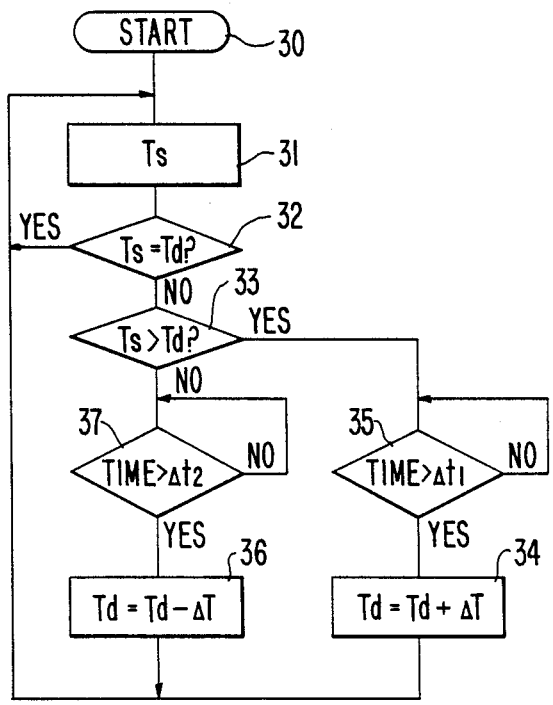
FIG. 6 is a flowchart illustrating the operation of the second embodiment of this invention.

Referring to FIG. 5, a block diagram of a measuring circuit for use in a device for detecting ambient air temperature in accordance with a second embodiment of this invention is shown. Identical reference numerals are used to identify elements corresponding to those described above with respect to the first embodiment of this invention, and a detailed description of these elements is, therefore, omitted to simplify the specification. The only difference between this embodiment and the embodiment shown in FIG. 2 is that the position of first delay means 223d relative to adding means 223b, and of second delay means 223e relative to subtracting means 223c, is reversed. Thus, in operation, steps 34 and 35, and steps 36 and 37 are executed in reverse order, as shown in the flowchart of FIG. 6. The operation of this embodiment is otherwise identical to that of the first embodiment so that the response of the control device to changes in detected ambient temperature is the same as that shown in FIG. 4.

Figure 7:
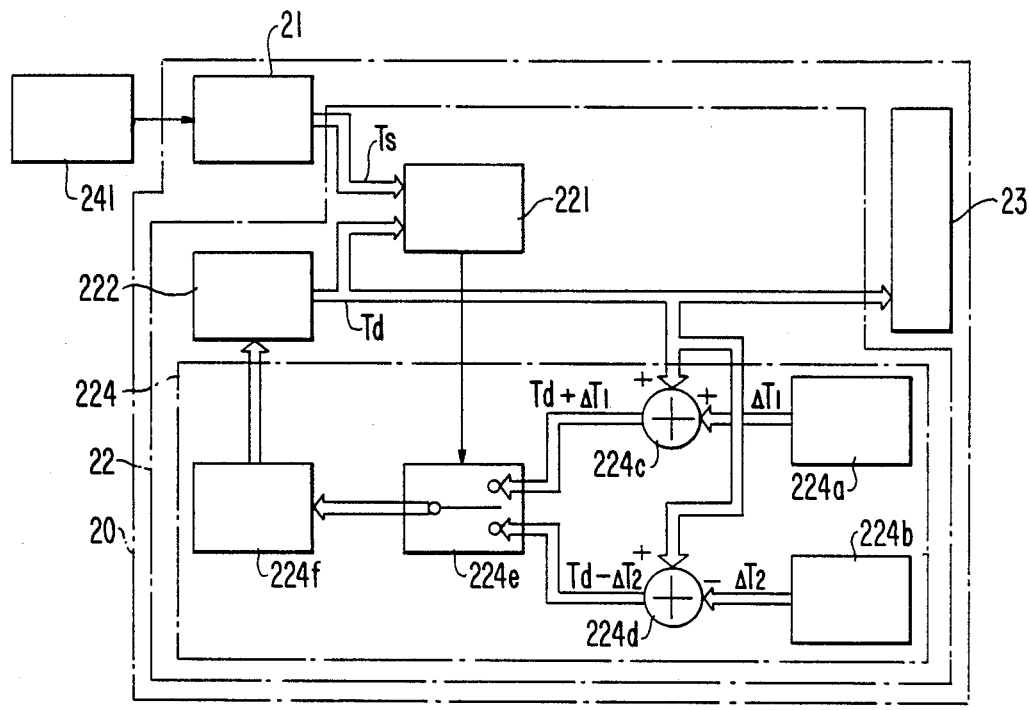
FIG. 7 is a block diagram which shows a measuring circuit for use in a device for detecting ambient air temperature in accordance with a third embodiment of this invention.

Referring to FIG. 7, a block diagram of a measuring circuit for use in a device for detecting ambient air temperature in accordance with a third embodiment of this invention is shown. Microcomputer 22 comprises compare means 221, ambient air temperature resistor 222 and central processing unit 224.

Central processing unit 224 includes first temperature change rate maintaining means 224a which stores a first predetermined temperature change rate $\Delta T1$, second temperature change rate maintaining means 224b which stores a second predetermined temperature change rate $\Delta T2$, adding means 224c, subtracting means 224d, selecting means 224e and delay means 224f. Adding means 224c adds first predetermined temperature change rate $\Delta T1$, which is output from first maintaining means 224a, to temperature data Td, which is output from temperature resistor 222, and outputs a signal to selecting means 224e. Subtracting means 224d subtracts temperature change rate $\Delta T2$, which is output from second maintaining means 224b, from temperature data Td and outputs a signal to selecting means 224e. Selecting means 224e selects a signal from adding means 224c in response to a first selective control signal from compare means 221, and selecting means 224e selects a signal from subtracting means 224d in response to a second selective control signal from compare means 221. The selected signal is output to delay means 224f which outputs the signal, after a predetermined delay time $\Delta t$, to temperature resistor 222. Temperature resistor 222 then stores the signal as new temperature data Td.

Figure 8:
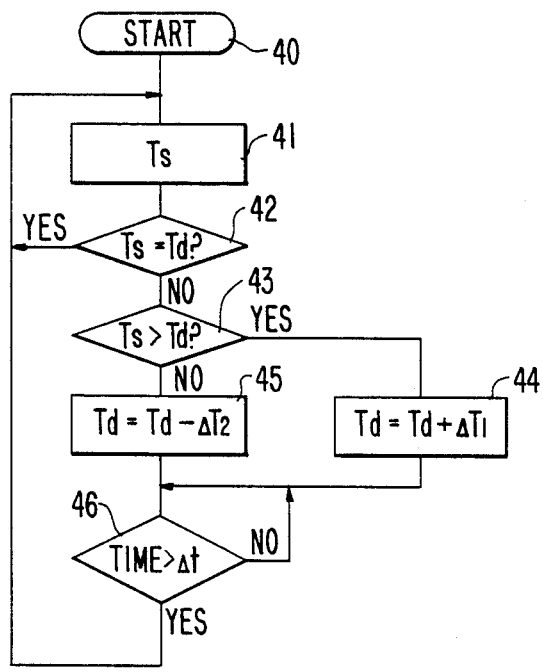
FIG. 8 is a flowchart illustrating the operation of the third embodiment of this invention.

Referring to FIG. 8, a flowchart illustrating the operation of microcomputer 22 in accordance with a third embodiment of this invention is shown. When the automotive air conditioning system is turned on in step 40, ambient air temperature sensor 241 detects the ambient air temperature and outputs detected temperature Ts, through A/D converter 21, to compare means 221 in step 41. In step 42, detected temperature Ts is compared with temperature data Td. If detected temperature Ts equals temperature data Td, control returns to step 41. Otherwise, control passes to step 43. If detected temperature Ts is greater than temperature data Td, control passes to step 44, and compare means 221 outputs a first selective control signal to selecting means 224e to thereby cause selecting means 224e to select a signal from adding means 224c. In step 44, first predetermined temperature change rate $\Delta T1$, output from first maintaining means 224a, is added to temperature data Td by adding means 224c and control passes to step 46. The signal output from adding means 224c is then input to delay means 224f, which outputs temperature data Td, which was computed at step 44, to temperature resistor 222 after a predetermined time $\Delta t$. Temperature data Td is then maintained in temperature resistor 222 as the new temperature data.

If, on the other hand, detected temperature Ts is less than temperature data Td, control passes to step 45 and compare means 221 outputs a second selective control signal to selecting means 224e to thereby cause selecting means 224e to select a signal from subtracting means 224d. In step 45, second predetermined temperature change rate $\Delta T2$, output from second maintaining means 224b, is subtracted from temperature data Td by subtracting means 224d and control passes to step 46. The signal output from subtracting means 224d is then input to delay means 224f through selecting means 224e. In step 46, delay means 224f outputs temperature data Td, which was computed at step 45, to temperature resistor 222 after a predetermined time $\Delta t$. Temperature data Td is then maintained in temperature resistor 222 as new temperature data. First predetermined temperature change rate ΔT1 is predetermined to be less than second predetermined temperature change rate ΔT2.

Figure 9:
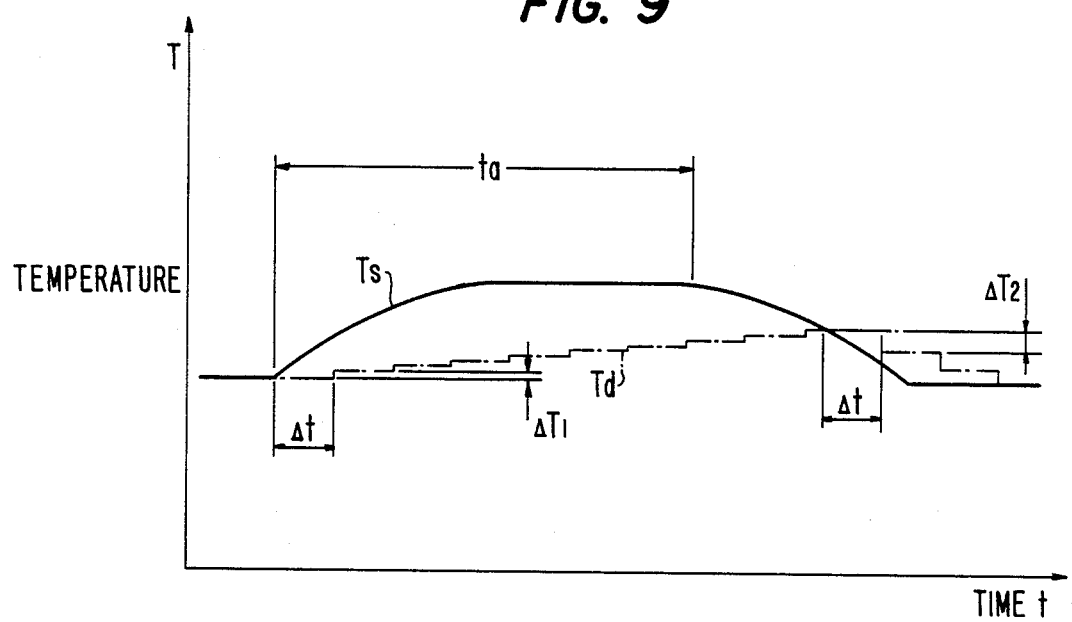
FIG. 9 is a graph illustrating the relationship between the ambient air temperature data maintained by the control device and the detected ambient air temperature as the detected air temperature changes over time in the third embodiment of this invention.

Referring to FIG. 9, a graph illustrating the relationship between the ambient air temperature data maintained by the control device and the detected ambient air temperature as the detected air temperature changes over time is shown. The time which the control device takes to respond to adjust ambient air temperature data Td while detected temperature Ts is increasing during idling time ta is longer than while detected temperature Ts is decreasing. Thus, when the automobile is driven following an idling period, temperature data Td can be quickly adjusted to approximate detected temperature Ts, which is the actual ambient air temperature.

Figure 10:
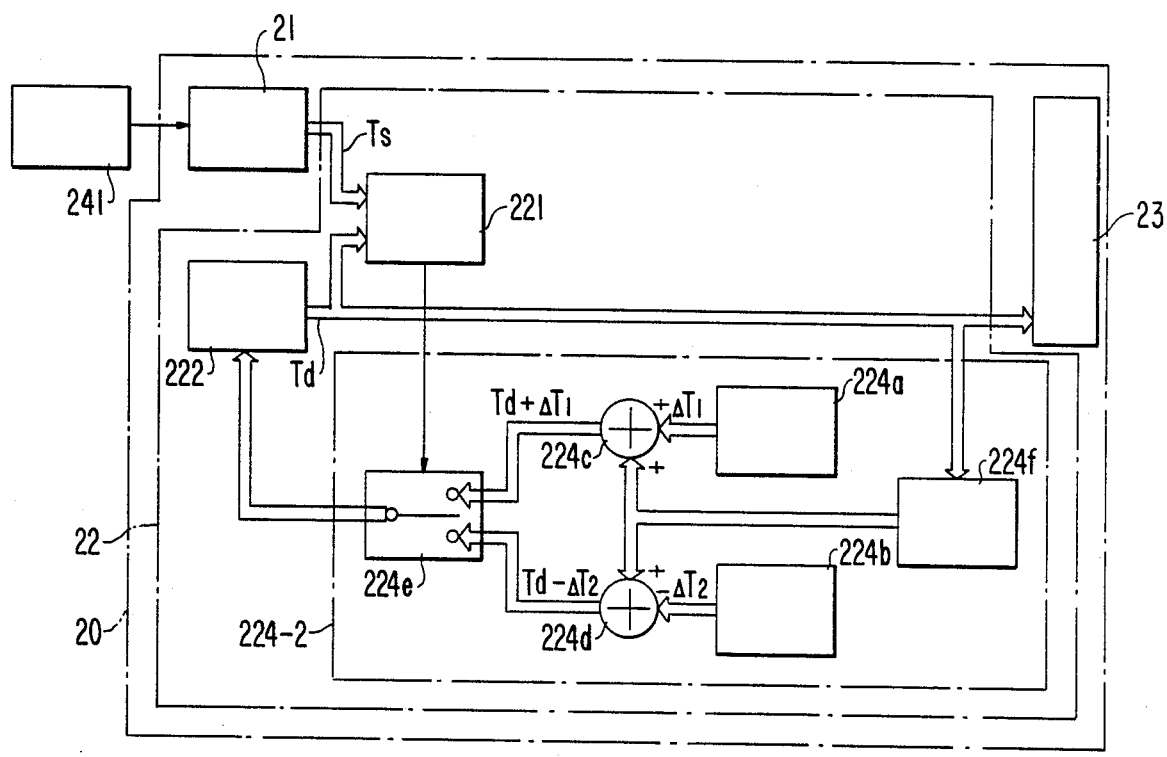
FIG. 10 is a block diagram which shows a measuring circuit for use in a device for detecting ambient air temperature in accordance with a fourth embodiment of this invention.
Figure 11:
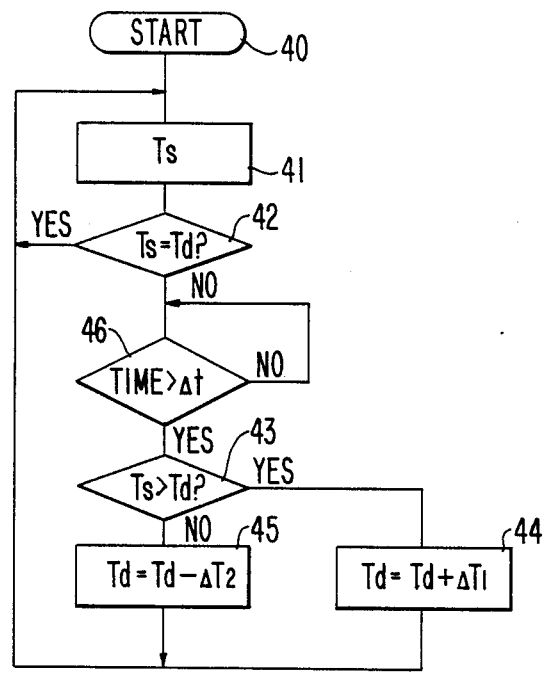
FIG. 11 is a flowchart illustrating the operation of the fourth embodiment of this invention.

Referring to FIG. 10, a block diagram of a measuring circuit for use in a device for detecting ambient air temperature in accordance with a fourth embodiment of this invention is shown. Identical reference numerals are used to identify elements corresponding to those described above with respect to the third embodiment of this invention and a detailed description of these elements is, therefore, omitted to simplify the specification. The only difference between the third and fourth embodiments is that the input of delay means 224f in central processing unit 224-2 (FIG. 10) is connected to the output of temperature resistor 222, and the output of delay means 224f is connected to the inputs of first and second temperature change rate maintaining means 224a and 224b. Thus, in operation, step 46 is disposed between step 42 and step 43 as shown in FIG. 11. The operation of this embodiment is otherwise identical to that of the third embodiment so that the response of the control device to changes in detected ambient temperature is the same as that shown in FIG. 9.

Figure 12:
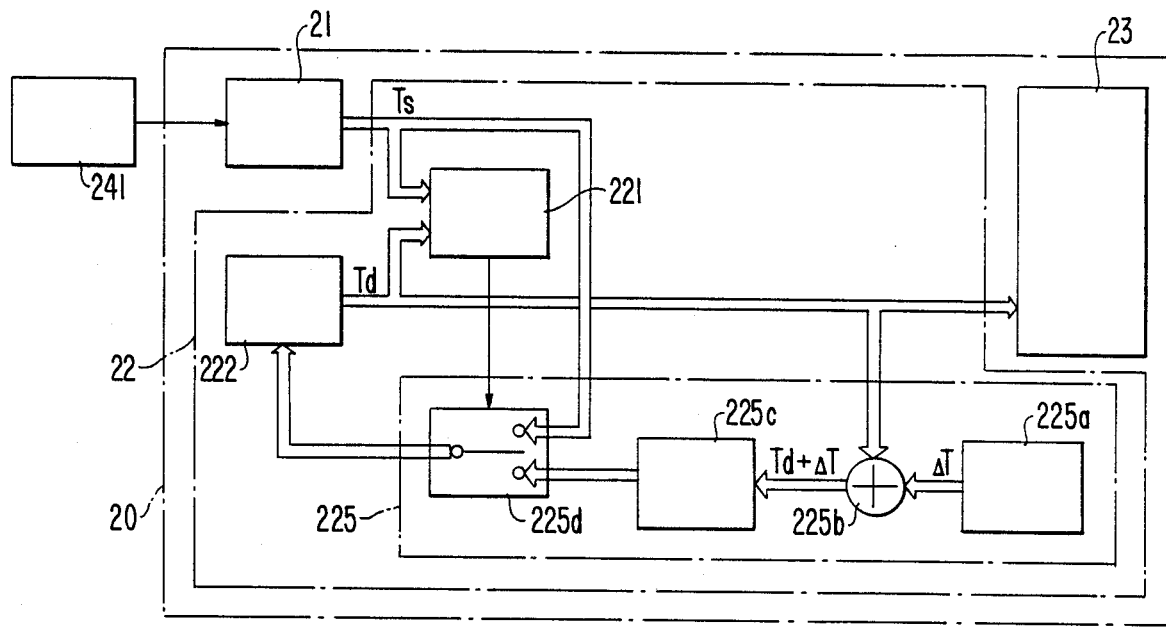
FIG. 12 is a block diagram which shows a measuring circuit for use in a device for detecting ambient air temperature in accordance with a fifth embodiment of this invention.

Referring to FIG. 12, a block diagram of a measuring circuit for use in a device for detecting ambient air temperature in accordance with a fifth embodiment of this invention is shown. Microcomputer 22 comprises compare means 221, ambient air temperature resistor 222 and central processing unit 225.

Central processing unit 225 includes temperature change rate maintaining means 225a which stores a predetermined temperature change rate ΔT, adding means 225b, delay means 225c, and selecting means 225d. Adding means 225b adds predetermined temperature change rate ΔT, output from temperature maintaining means 225a, to temperature data Td and outputs a signal to selecting means 225d, through delay means 225c, after a predetermined time Δt. A/D converter 21 outputs a signal, representative of the temperature detected by ambient air temperature sensor 241, to compare means 221 and to selecting means 225d. Selecting means 225d selects an output from delay means 225c in response to a first selective control signal from compare means 221, and selecting means 225d selects detected temperature Ts from A/D converter 21 in response to a second selective control signal from compare means 221. Selecting means 225d then outputs the selected signal to temperature resistor 222, which maintains the signal as the new temperature data.

Figure 13:
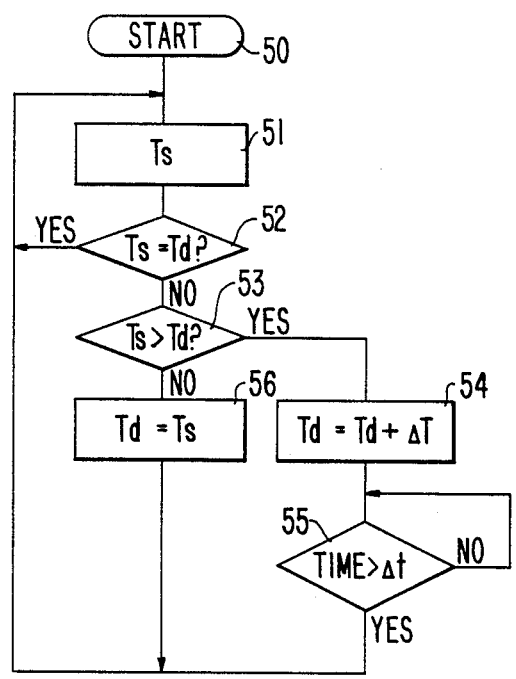
FIG. 13 is a flowchart illustrating the operation of the fifth embodiment of this invention.

Referring to FIG. 13, a flowchart illustrating the operation of microcomputer 22 in accordance with the fifth embodiment is shown. When the automotive air conditioning system is turned on in step 50, ambient air temperature sensor 241 detects the ambient air temperature and outputs detected temperature Ts to compare means 221, through A/D converter 21, in step 51. Control then passes to step 52, where detected temperature Ts is compared with temperature data Td. If detected temperature Ts equals temperature data Td, control returns to step 51. Otherwise, control passes to step 53. If detected temperature Ts is greater than temperature data Td, control passes from step 53 to step 54, and compare means 221 outputs a first selective control signal to selecting means 225d thereby causing selecting means 225d to select a signal from delay means 225c. In step 54, adding means 225b adds predetermined temperature change rate ΔT, which is output from temperature maintaining means 225a, to temperature data Td and outputs a signal to delay means 225c. Delay means 225c then outputs the signal to temperature resistor 222, through selecting means 225d, after a predetermined time Δt (step 55).

In step 53, if detected temperature Ts is less than temperature data Td, control passes to step 56 and compare means 221 outputs a second selective control signal to selecting means 225d thereby causing selecting means 225 to select a signal from A/D converter 21. Selecting means 225d then outputs the signal to temperature resistor 222, which stores detected temperature Ts as the new temperature data Td in step 56.

Figure 14:
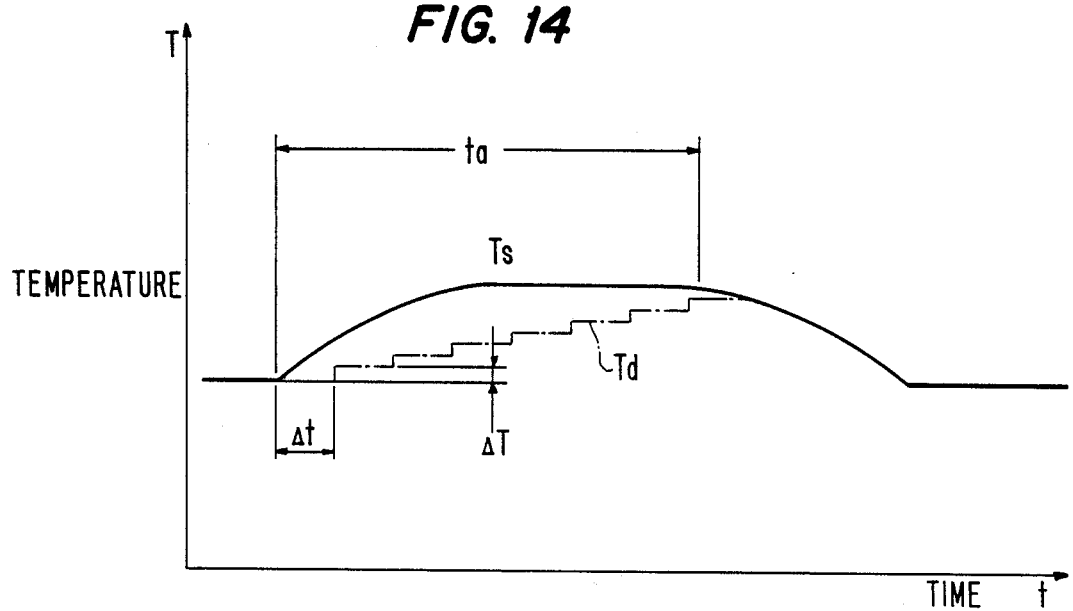
FIG. 14 is a graph illustrating the relationship between the ambient air temperature data maintained by the control device and the detected ambient air temperature as the detected air temperature changes over time in the fifth embodiment of this invention.

With reference to FIG. 14, a graph illustrating the relationship between the ambient air temperature data maintained by the control device and the detected ambient air temperature as the detected air temperature changes over time is shown. Temperature data Td is increased, with a time lag, when detected temperature Ts increases. However, when detected temperature Ts decreases, temperature data Td is adjusted so that it equals detected temperature Ts. Thus, when the automobile is driven following an idling period ta, temperature data Td can be quickly adjusted to approximate detected temperature Ts, which is the actual ambient air temperature.

Figure 15:
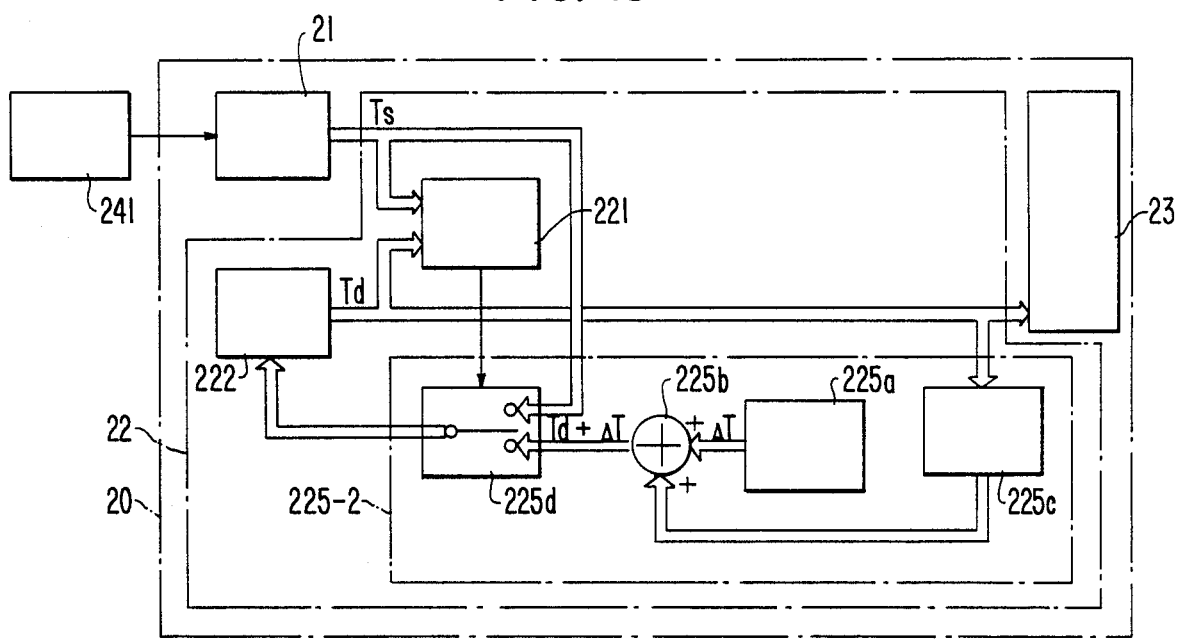
FIG. 15 is a block diagram which shows a measuring circuit for use in a device for detecting ambient air temperature in accordance with a sixth embodiment of this invention.
Figure 16:
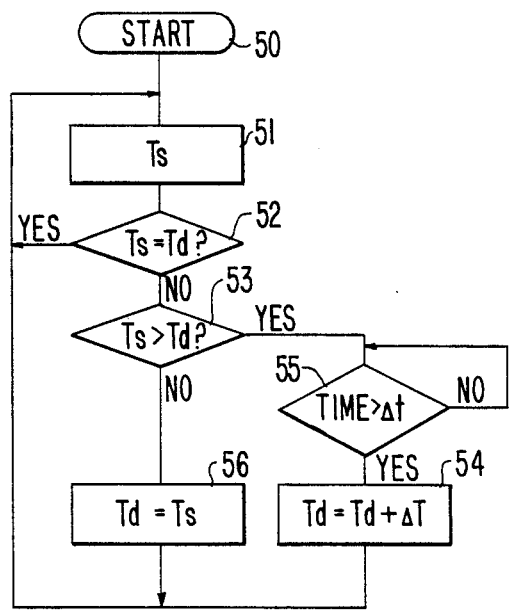
FIG. 16 is a flowchart illustrating the operation of the sixth embodiment of this invention.

Referring to FIG. 15, a block diagram of a measuring circuit for use in a a device for detecting ambient air temperature in accordance with a sixth embodiment of this invention is shown. Identical reference numerals are used to identify elements corresponding to those described above with respect to the fifth embodiment of this invention. A detailed description of these elements is, therefore, omitted to simplify the specification. The only differences between the fifth and sixth embodiments are that the input of delay means 225c is coupled to the output of temperature resistor 222 and the output of delay means 225c is coupled to adding means 225b, and adding means 225b is directly connected to selecting means 225d. Thus, in operation, step 55 is executed before step 54, as shown in the flowchart of FIG. 16. The operation of this embodiment is otherwise identical to that of the fifth embodiment so that the response of the control device to a change in detected ambient temperature is the same as shown in FIG. 14.

This invention has been described in connection with the preferred embodiments, but these embodiments are merely for example only, and the invention should not be construed as limited thereto. It should be apparent to those skilled in the art that other variations or modifications can be made within the scope of this invention.

We claim:

1. A device for controlling an opening angle of an air mixing damper used in an automotive conditioning system having an actuator for operating the air mixing damper and a blower for blowing the air, said device comprising:

ambient air temperature sensor means disposed on a front grill of an automobile for detecting the ambient air temperature at the exterior of the automobile and providing a control signal; and measuring means for measuring ambient air temperature data necessary for controlling said actuator and said blower, said measuring means including;

ambient air temperature resistor means for maintaining said ambient air temperature data, compare means for comparing an ambient air temperature detected by said sensor means with said ambient air temperature data and providing a first selective control signal when said detected ambient air temperature is greater than said ambient air temperature data and a second selective control signal when said detected ambient air temperature is less than said detected ambient air temperature data, and processing means for adjusting said ambient air temperature data in a first response time in response to said first selective control signal, or in a second response time in response to said second selective control signal, and providing said adjusted ambient air temperature data to said ambient air temperature resistor.

2. The device of claim 1 wherein said first response time is longer than said second response time.

3. The device of claim 1 wherein said processing means comprises:
storage means for storing a predetermined temperature change rate;
adding means for adding said predetermined temperature change rate to said ambient air temperature data and providing a first control signal;
subtracting means for subtracting said predetermined temperature change rate from said ambient air temperature data and providing a second control signal;
first delay means for delaying said first control signal for a first predetermined time;
second delay means for delaying said second control signal for a second predetermined time; and
selecting means for selecting said first control signal in response to said first selective control signal and for detecting said second control signal in response to said second selective control signal, said selecting means providing a selected control signal to said ambient air temperature resistor means.

4. The device of claim 1 wherein said processing means comprises:
first delay means for delaying said ambient air temperature data for a first predetermined time;
second delay means for delaying said ambient air temperature data for a second predetermined time;
storage means for storing a predetermined temperature change rate;
adding means for adding said predetermined temperature change rate to said ambient air temperature data and providing a first control signal;
subtracting means for subtracting said predetermined temperature change rate from said ambient air temperature data and providing a second control signal; and
selecting means for selecting said first control signal in response to said first selective control signal and for selecting said second control signal in response to said second selective control signal and providing the selected control signal to said ambient air temperature resistor means.

5. The device of claim 3 or 4 wherein said first predetermined time is longer than said second predetermined time.

6. The device of claim 1 wherein said processing means comprises:
first storage means for storing a first predetermined temperature change rate;
second storage means for storing a second predetermined temperature change rate;
adding means for adding said first predetermined temperature change rate to said ambient air temperature data and providing a first control signal;
subtracting means for subtracting said second predetermined temperature change rate from said ambient air temperature data and providing a second control signal;
selecting means for selecting said first control signal in response to said first selective control signal and for selecting said control signal in response to said second selective control signal; and
delay means for providing said selected control signal to said ambient air temperature resistor means after a predetermined time delay.

7. The device of claim 1 wherein said processing means comprises:
delay means for delaying said ambient air temperature data for a predetermined time and for providing a first control signal;
first storage means for storing a first predetermined temperature change rate;
second storage means for storing a second predetermined temperature change rate;
adding means for adding said first predetermined temperature change rate to said first control signal and providing a second control signal;
subtracting means for subtracting said second predetermined temperature change rate from said first control signal and providing a third control signal; and
selecting means for selecting said second control signal in response to said first selective control signal and for selecting said third control signal in response to said second selective control signal and providing the selected control signal to said ambient air temperature resistor.

8. The device of claim 6 or 7 wherein said first predetermined temperature change rate is less than said second predetermined temperature change rate.

9. The device of claim 1 wherein said processing means comprises:
storage means for storing a predetermined temperature change rate;
adding means for adding said predetermined temperature change rate to said ambient air temperature data and providing a first control signal;
delay means for delaying said first control signal for a predetermined time and providing a second control signal; and
selecting means for selecting said second control signal in response to said first selective control signal and for selecting said control signal from said ambient air temperature sensor means in response to said second selective control signal and providing the selected control signal to said ambient air temperature resistor.

10. The device of claim 1 wherein said processing means comprises:

delay means for delaying said ambient air temperature data for a predetermined time and providing a first control signal;

storage means for storing a predetermined temperature change rate;

adding means for adding said predetermined temperature change rate to said first control signal and providing a second control signal; and selecting means for selecting said second control signal in response to said first selective control signal and for selecting said control signal from said ambient air temperature sensor means in response to said second selective control signal and providing the selected signal to said ambient air temperature resistor.

* * * * *